United States Patent [19]
Takamiya et al.

[11] Patent Number: 5,629,793
[45] Date of Patent: May 13, 1997

[54] FREQUENCY SHIFTER AND OPTICAL DISPLACEMENT MEASUREMENT APPARATUS USING THE SAME

[75] Inventors: Makoto Takamiya, Tokyo; Hidejiro Kadowaki, Yokohama, both of Japan

[73] Assignee: Canon Kabushiki Kaisha, Tokyo, Japan

[21] Appl. No.: 499,125

[22] Filed: Jul. 7, 1995

[30] Foreign Application Priority Data

Jul. 11, 1994 [JP] Japan .................................. 6-181760
Feb. 17, 1995 [JP] Japan .................................. 7-053445

[51] Int. Cl.⁶ .................................................. G02F 01/23
[52] U.S. Cl. .................................. 359/278; 356/356
[58] Field of Search ........................... 354/278, 279; 356/356, 358, 28.5

[56] References Cited

U.S. PATENT DOCUMENTS 4,019,159  4/1977  Hon et al. ........................ 332/7.51
5,050,993  9/1991  Tansey ............................. 366/356
5,229,830  7/1993  Ishida et al. ................... 356/28.5
5,383,048  1/1995  Seaver ............................. 359/279
5,459,571  10/1995 Dammann et al. ............... 356/345
5,502,562  3/1996  Werle ............................. 356/349

FOREIGN PATENT DOCUMENTS 2-262064  10/1990  Japan .
4-230885  8/1992  Japan .

*Primary Examiner*—Mark Hellner
*Attorney, Agent, or Firm*—Fitzpatrick, Cella, Harper & Scinto

[57] ABSTRACT

A frequency shifter for modulating the frequency of an incident light beam is disclosed. This frequency shifter includes an electro-optic crystal portion to be arranged at an incident position, an electrode arranged on the electro-optic crystal portion, a voltage application unit for applying a voltage to the electro-optic crystal portion via the electrode, and a unit which is arranged at least at a portion of the electro-optic crystal portion to uniformize the temperature of the electro-optic crystal portion.

13 Claims, 7 Drawing Sheets

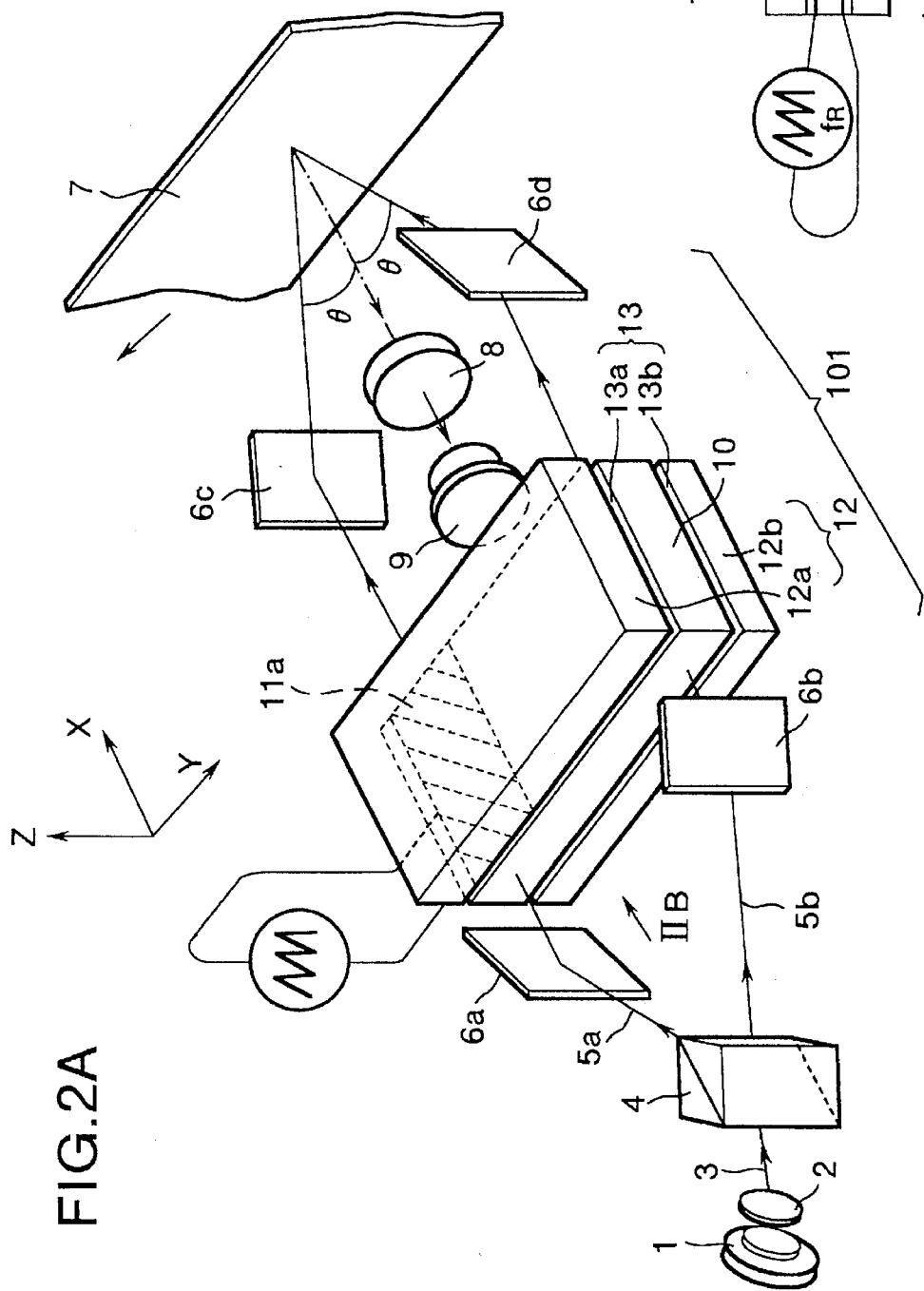
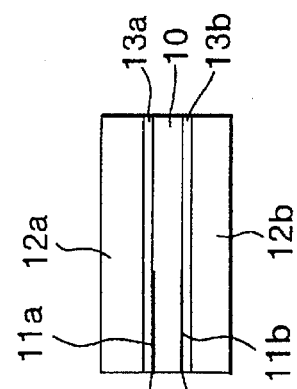
FIG. 2A
FIG. 2B

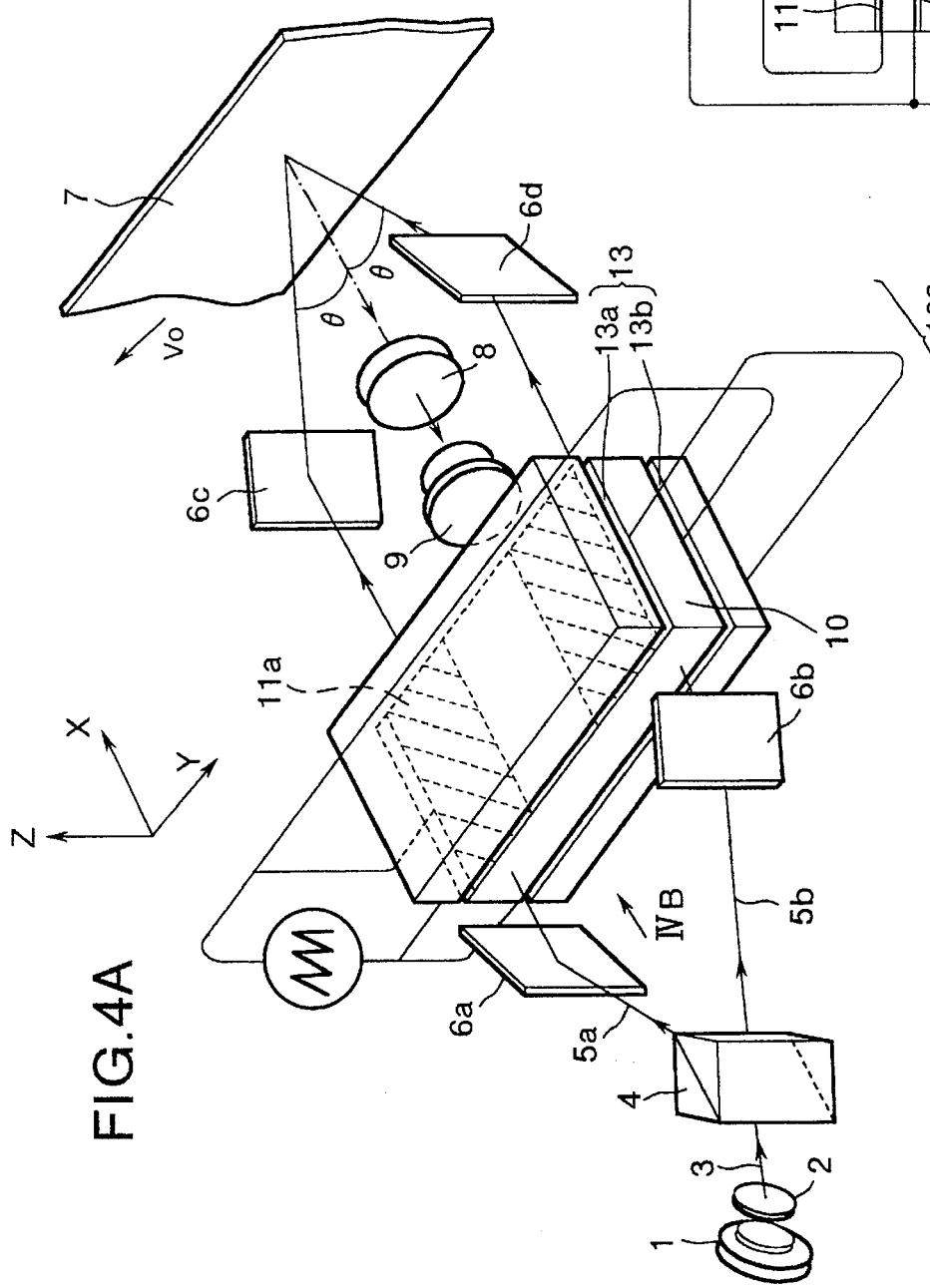

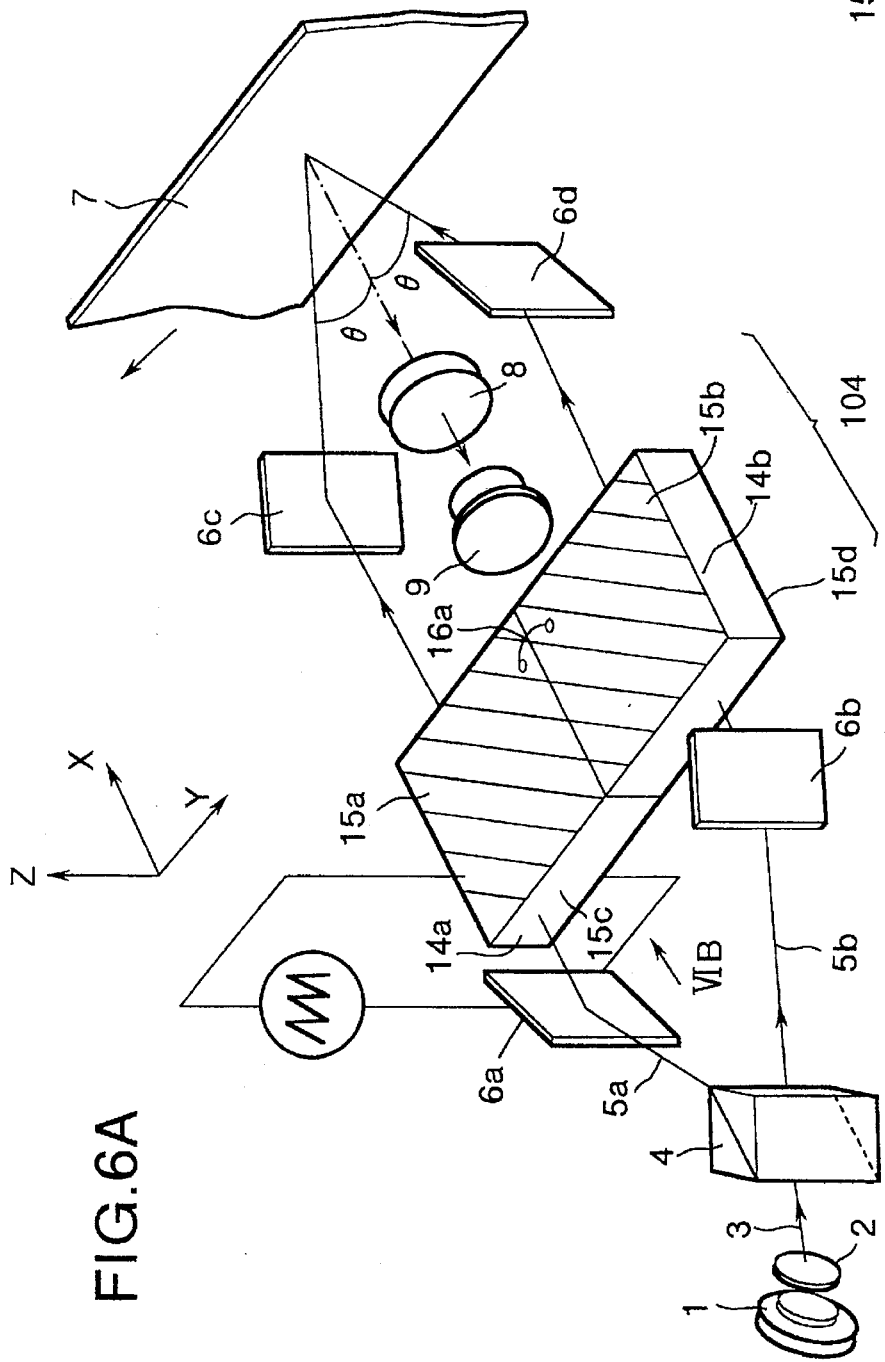
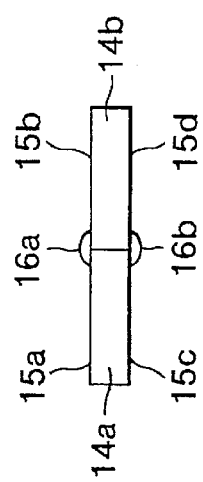
FIG.6A
FIG.6B

FREQUENCY SHIFTER AND OPTICAL DISPLACEMENT MEASUREMENT APPARATUS USING THE SAME

BACKGROUND OF THE INVENTION

1. Field of the Invention

The present invention relates to a frequency shifter and an optical displacement measurement apparatus using the same and, more particularly, to a frequency shifter and an optical displacement measurement apparatus using the same, which are suitably used to measure the displacement information of a moving object or fluid (to be referred to as "a moving object" hereinafter) in a non-contact manner by detecting a shift in the frequency of each scattered light beam having undergone a Doppler shift in accordance with the moving velocity of the moving object.

2. Description of the Related Art

Conventionally, as an apparatus for precisely measuring the displacement information of a moving object in a non-contact manner, a laser Doppler velocimeter or laser encoder (optical displacement measurement apparatus) has been used. The laser Doppler velocimeter measures the moving velocity of a moving object by utilizing an effect (Doppler effect) that when a laser beam is irradiated onto a moving object, the frequency of the laser beam scattered by the moving object shifts in proportion to the moving velocity.

The present applicant proposed such laser Doppler velocimeters in, e.g., Japanese Laid-Open Patent Application Nos. 2-262064 and 4-230885.

The following method has been described by Foord et al., (Appl. Phys., Vol. 7, 1974, pp. 136–139). In a laser Doppler velocimeter, a frequency shifter using flat plates consisting of electro-optic crystals (to be referred to as "electro-optic elements" hereinafter) is arranged on the optical paths of two light beams, and the two light beams are incident on a moving object with a predetermined frequency difference being set between the light beams by means of the frequency shifter. According to this method, even if the moving direction and velocity of a moving object are close to zero, the moving velocity can be measured with high precision.

FIG. 1A is a schematic view showing the main part of a laser Doppler velocimeter using the above detection principle. Referring to FIG. 1A, a frequency shifter 100 is constituted by two electro-optic elements 10a and 10b, their driving circuits, and the like.

A parallel light beam 3 having a wavelength λ, which is emitted from a light source, is split into two light beams 5a and 5b by a beam splitter 4. The respective light beams are incident on the electro-optic elements 10a and 10b constituting the frequency shifter 100.

In this case, the light beams 5a and 5b undergo frequency shifts based on the sawtooth waveform voltage driving (serrodyne driving) of the electro-optic elements 10a and 10b. With this operation, a frequency difference is imparted to the two light beams 5a and 5b, and the two light beams are deflected by a lens 6 to be incident on a moving object, which is moving in the direction indicated by the arrow at a velocity $V_0$, in such a manner that the two light beams cross each other at an incident angle θ. When light scattered by the moving object, of the incident light beams, is guided to a photodetector, a Doppler signal can be obtained from the photodetector.

In this case, the frequencies of the scattered light beams of the two light beams are subjected to Doppler shifts in proportion to the moving velocity $V_0$ to cause interference on a detection surface, thereby causing a change in density pattern. The frequency of this change in density pattern, i.e., a Doppler frequency F, is given by $$F = 2 \cdot V_0 \cdot \sin(\theta)/\lambda + f_R \tag{1}$$

where $f_R$ is the frequency difference between the two light beams. With this method, even if the velocity $V_0$ of the moving object is low or close to zero, the moving velocity and direction of the moving object can be simultaneously measured by setting a proper value as the frequency difference $f_R$.

In general, when highly coherent light such as a laser beam is irradiated onto an object, light scattered by a fine irregularity on a surface of the object is randomly phase-modulated to form a dot pattern, i.e., a so-called speckle pattern, on the observation surface. In the laser Doppler velocimeter, when an object moves, a change in density pattern due to the Doppler shift on the detection surface of the photodetector is modulated by an irregular change in density pattern due to the flow of the speckle pattern, and the output signal from the photodetector is also modulated by a change in transmittance (or reflectance) of an object to be measured.

In the laser Doppler velocimeter, the frequency of change in density pattern due to the flow of a speckle pattern and the frequency of change in transmittance (or reflectance) of a moving object are generally lower than a Doppler frequency based on displacement information. For this reason, the output from the photodetector is supplied to a high-pass filter to remove the low-frequency components to extract only a Doppler signal.

If, however, the velocity of the moving object is low and the Doppler frequency is low, the frequency difference between the Doppler frequency and the low-frequency variation components becomes small, and a high-pass filter cannot be used. This makes it difficult to measure the displacement information of the moving object with high precision. In addition, the velocity direction cannot be detected in principle.

In contrast to this, according to the above method (frequency shifter) disclosed by Foord et al., a predetermined frequency difference is set between two light beams before the light beams are irradiated onto a moving object to allow measurement of the stationary state and velocity direction of the moving object.

Frequency shifters having various arrangements are available. If, for example, a frequency shift using electro-optic crystals are applied to the above method, an ordinary index $n_o$ and an extraordinary index $n_e$ of each electro-optic crystal greatly change with a change in temperature. As shown in FIG. 1B, in particular, the refractive index of the electro-optic crystal is very sensitive to temperature. For this reason, a frequency shift becomes unstable with a slight temperature difference or temperature gradient of the electro-optic element. In addition, if a temperature gradient occurs at a light-transmitting portion, the light beam wave surface is distorted. As a result, a strict interference system is difficult to form.

Owing to the above problems, difficulties have been posed in realizing practical applications of a frequency shifter, as a bulk type device, to which electro-optic crystals are applied. Furthermore, in order to cause a slight frequency shift, a voltage applied to each electro-optic element must be decreased. If, however, the voltage applied to the electro-optic element 10a is decreased, a structure near the electro-optic element is complicated.

SUMMARY OF THE INVENTION

It is an object of the present invention to realize a frequency shifter for imparting a frequency difference to two light beams irradiated on a moving object, which frequency shifter eliminates temperature gradients of two electro-optic elements and a temperature gradient at light-transmitting portions so as to have stable precision, and to provide an optical displacement measurement apparatus which uses the frequency shifter to impart an appropriate frequency difference to two light beams to detect displacement information with high precision even if the velocity of the moving object is low.

It is another object of the present invention to provide a frequency shifter and an optical displacement measurement apparatus which can easily apply a low application voltage with a simple arrangement by setting an appropriate arrangement for the frequency shifter.

Other objects of the present invention will become apparent from the following description of the embodiments.

BRIEF DESCRIPTION OF THE DRAWINGS

FIGS. 2A and 2B are views showing the main part of the first embodiment of the present invention, FIG. 2B being a view seen from an arrow IIB in FIG. 2A;

FIGS. 4A and 4B are views showing the main part of the second embodiment of the present invention, FIG. 4B being a view seen from an arrow IVB in FIG. 4A;

FIGS. 6A and 6B are views showing the main part of the fourth embodiment of the present invention, FIG. 6B being a view seen from an arrow VIB in FIG. 6A.

DETAILED DESCRIPTION OF THE PREFERRED EMBODIMENTS

Figure 1A:
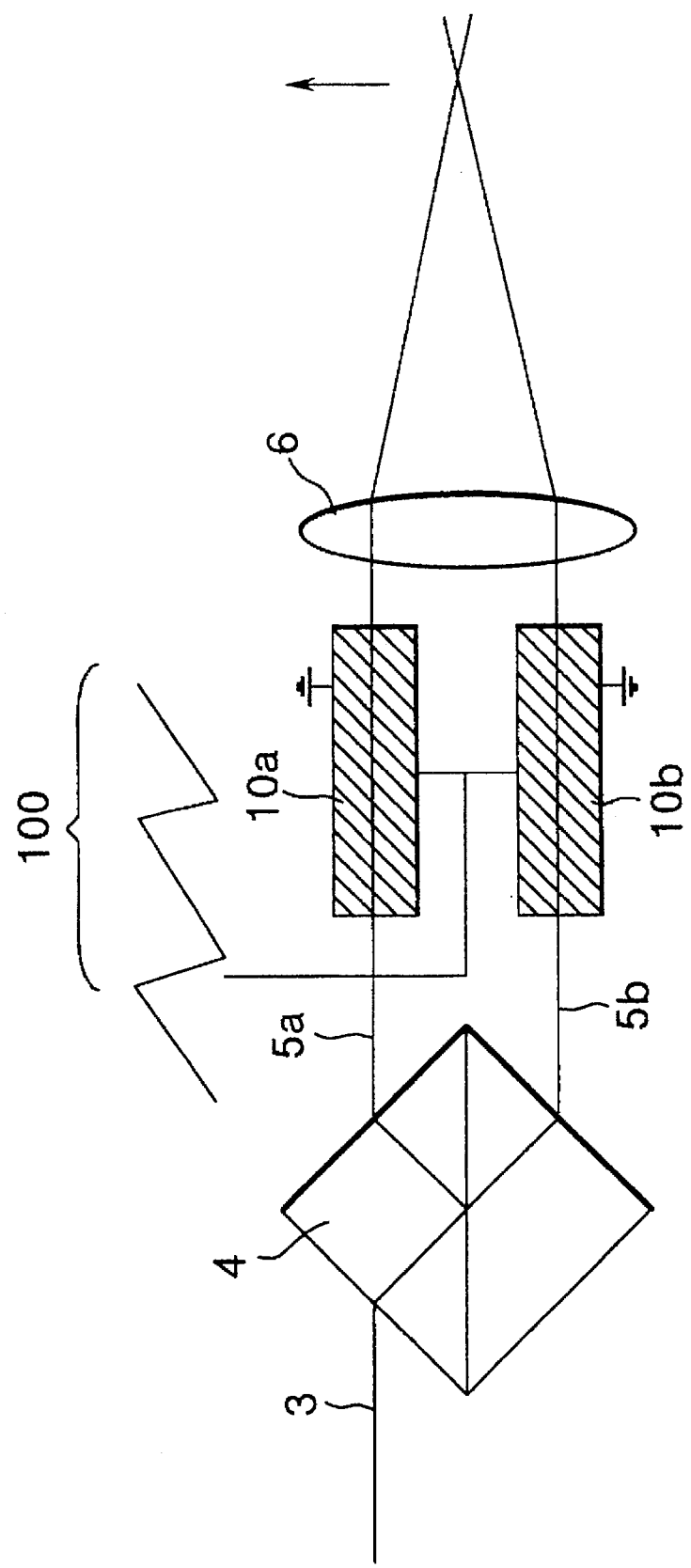
FIG. 1A is a schematic view showing the main part of a conventional laser Doppler velocimeter to which a frequency shifter is applied.
Figure 1B:
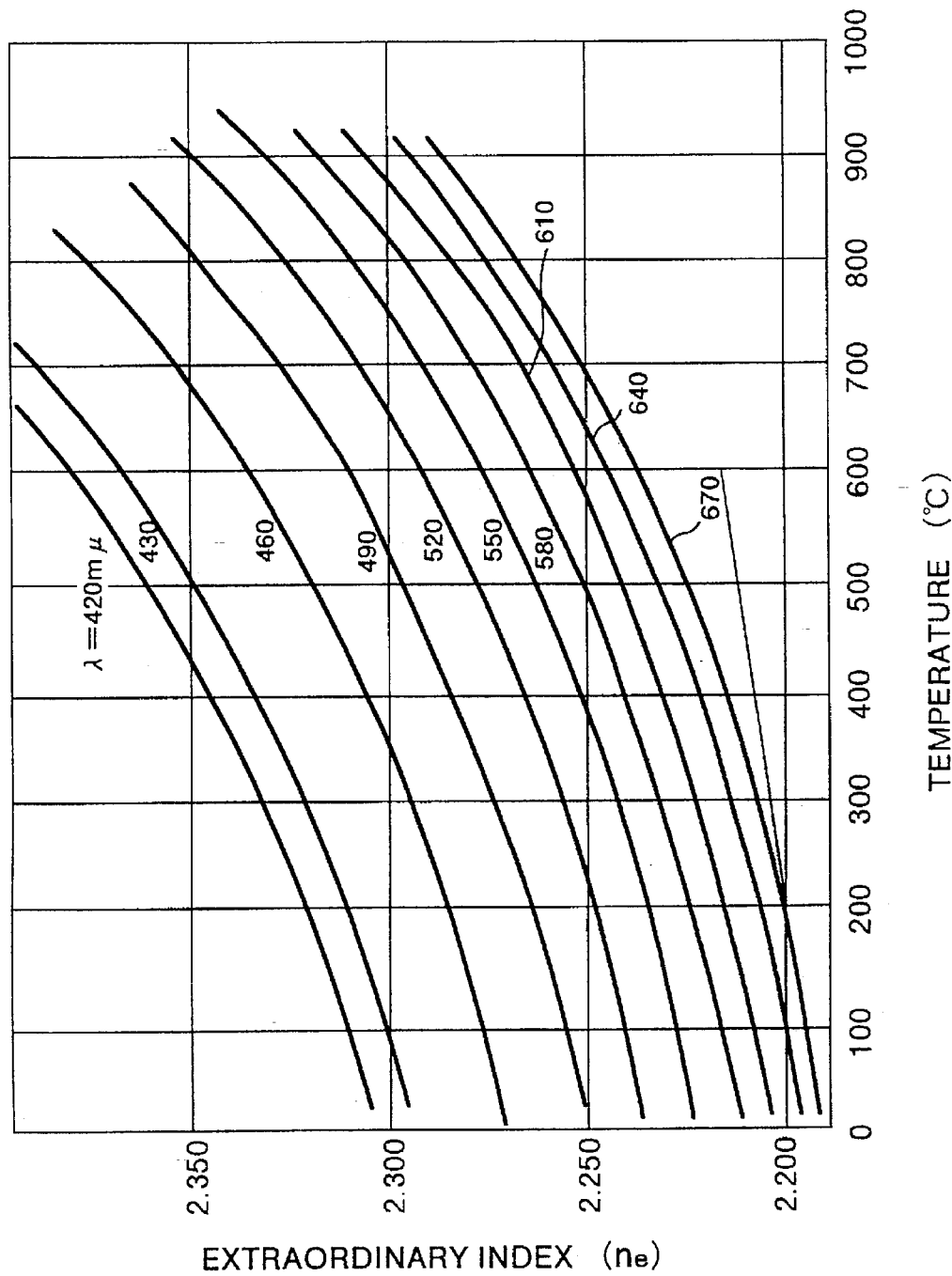
FIG. 1B is a graph showing the temperature dependence of an extraordinary index $n_e$ of an electro-optic element.

FIGS. 2A and 2B are views showing the main part of a frequency shifter and an optical displacement measurement apparatus using the same according to the first embodiment of the present invention.

Referring to FIGS. 2A and 2B, the apparatus includes a laser light source 1, a collimator lens 2, a beam splitter 4, and mirrors 6a to 6d. A moving object 7 is subjected to velocity measurement. The moving object 7 moves at a velocity $V_0$. The apparatus further includes a focusing lens 8, a photodetector 9, and a frequency shifter 101 of the first embodiment of the present invention.

The characteristic features of the arrangement of the frequency shifter 101 will be described first. Referring to FIGS. 2A and 2B, the frequency shifter 101 includes a flat plate (electro-optic element) consisting of electro-optic crystal $LiNbO_3$, and electrodes 11a and 11b mounted on the upper and lower surfaces of the electro-optic element 10. These electrodes 11 (11a, 11b) are designed to apply an electric field to only a light-transmitting portion for a light beam 5a (to be described later). Heat conductors (temperature uniformizing means) 12 (12a, 12b) consist of a good heat conductor such as copper and covers two light-transmitting portions. Silicone rubber sheets 13 (13a, 13b) serve to increase the thermal bonding strengths between the electro-optic element 10 and the heat conductors 12 while electrically insulating them from each other.

Figure 3A:
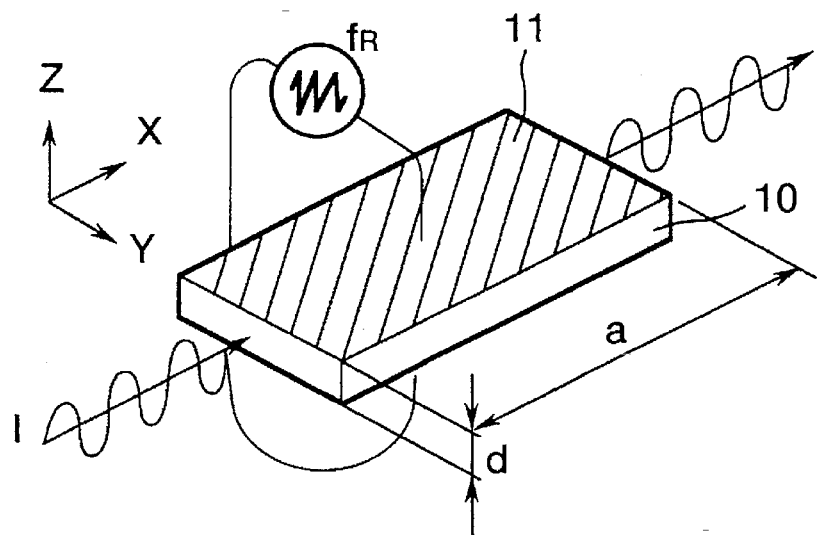
FIG. 3A is a perspective view for explaining a frequency shifter using electro-optic crystals.

FIG. 3A is a view for explaining the operation of the frequency shifter using the electro-optic element 10 in this embodiment. In the electro-optic crystal, the refractive index of the medium changes depending on the electric field to be applied. For example, trigonal systems 3m such as $LiNbO_3$, $LiTaO_3$, and the like, and tetragonal systems 42m such as $(NH_4)H_2PO_4$(ADP), $KH_2PO_4$(KDP), and the like are known. The following explanation will be given taking $LiNbO_3$ as an example. The index ellipsoid of $LiNbO_3$ (3m) is given by:

$$\left[ \frac{1}{n_o^2} - \gamma_{22}E_2 + \gamma_{13}E_3 \right] X^2 + \qquad (2)$$

$$\left[ \frac{1}{n_o^2} + \gamma_{22}E_2 + \gamma_{13}E_3 \right] Y^2 + \left[ \frac{1}{n_e^2} + \gamma_{33}E_3 \right] Z^2 -$$

$$2\gamma_{22}E_1XY + 2\gamma_{51}E_2YZ + 2\gamma_{51}E_1ZX = 1$$

When an electric field is applied along the Z-axis ($E_3 \neq 0$, $E_1 = E_2 = 0$), and the propagating direction of light is set in the X-axis, as shown in FIG. 3A, the index ellipsoid within a cross-sectional plane defined by X=0 is given by:

$$\left[ \frac{1}{n_o^2} + \gamma_{13}E_3 \right] Y^2 + \left[ \frac{1}{n_e^2} + \gamma_{33}E_3 \right] Z^2 = 1 \qquad (3)$$

where $\gamma$ is a Pockels constant, and $n_o$ and $n_e$ are respectively ordinary and extraordinary indices.

Since $n^{e3}\gamma_{33}E_3 \ll 1$ equation (3) is simplified as follows:

$$\frac{Y^2}{n_o^2\left[1 - \frac{1}{2}n_o^2\gamma_{13}E_3\right]^2} + \frac{Z^2}{n_e^2\left[1 - \frac{1}{2}n_e^2\gamma_{33}E_3\right]^2} = 1 \qquad (4)$$

If the direction of polarization of a light beam I is set in the Z-axis, a refractive index $N(E_3)$ based on the electric field is given in consideration of only Z as follows:

$$N(E_3) = n_e \left[ 1 - \frac{1}{2}n_e^2\gamma_{33}E_3 \right] \qquad (5)$$

Letting d be the thickness of $LiNbO_3$, then voltage $V=E_3d$, and a phase difference $\Gamma(V)$ of light transmitted through $LiNbO_3$ having a length a with respect to a voltage difference is given by $$\Gamma(V) = \left[ \frac{2\pi}{\lambda} \right] \left\{ N\left[\frac{V}{d}\right] - N(0) \right\} a = -\frac{\pi n_e^3 \gamma_{33} a}{\lambda d} V \qquad (6)$$

where $\lambda$ is the wavelength of the light beam I.

Figure 3B:
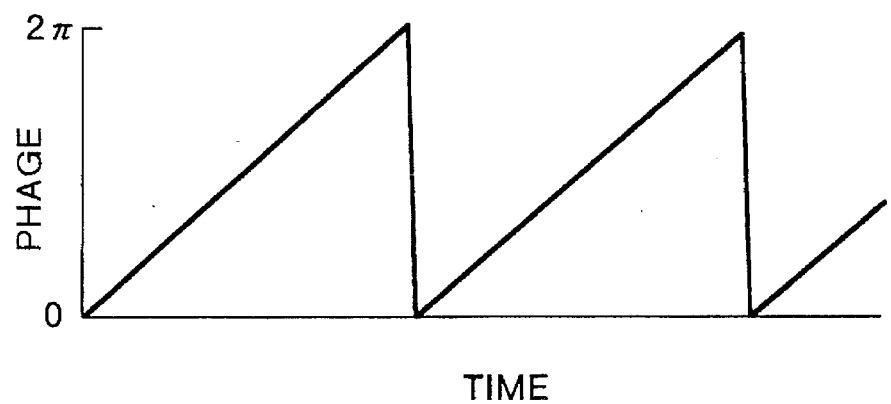
FIG. 3B is a view for explaining a serrodyne driving operation.

If the rate of change in voltage V per unit time is set to be constant, light transmitted through $LiNbO_3$ has a constant rate of change of phase change amount per unit time. In other words, the crystal serves as a frequency shifter. However, when the voltage is changed at a constant rate, the voltage increases infinitely. For this reason, in practice, a sawtooth waveform (serrodyne) driving operation is performed, as shown in FIG. 3B. The driving operation is performed by a value with which the voltage amplitude corresponds to an optical phase of $2\pi$, so the optical phase does not become discontinuous in a return portion.

The operation of the optical displacement measurement apparatus of this embodiment shown in FIG. 2A will be described next. Referring to FIG. 2A, a laser beam emitted from the laser light source 1 is collimated into a parallel light beam 3 by the collimator lens 2. The parallel light beam 3 is then split into the light beams 5a and 5b by the beam splitter 4. The light beams 5a and 5b are reflected by the mirrors 6a and 6b. Thereafter, both the light beams 5a and 5b are incident, as light beams polarized in the direction of the Z-axis, on the electro-optic element 10, and only the light beam 5a undergoes a frequency shift in the frequency shifter 101. The light beam 5a (5b) emerging from the frequency shifter 101 is reflected by the mirror 6c (6d) and is incident on the moving object 7 at an incident angle θ, which object is moving in the direction indicated by an arrow at a velocity $V_0$.

Scattered light from the moving object 7 is detected by the photodetector 9 via the focusing lens 8. The frequencies of the scattered light beams based on the two light beams 5a and 5b are subjected to Doppler shifts of +f and −f in proportion to the moving velocity $V_0$. Let λ be the wavelength of the laser beam. Then, a frequency f can be expressed by equation (7) below:

$$f = V_0 \cdot \sin(\theta)/\lambda \qquad (7)$$

The scattered light beams having undergone the Doppler shifts of +f and −f interfere with each other, and cause a change in density pattern on the light-receiving surface of the photodetector 9. Letting $f_R$ be the frequency difference between the two light beams, which difference is set by the electro-optic element 10, a frequency F of the change in density pattern is given by equation (8) below:

$$F = 2 \cdot f + f_R = 2 \cdot V_0 \cdot \sin(\theta)/\lambda + f_R \qquad (8)$$

The velocity $V_0$ of the moving object 7 can be obtained by measuring the frequency F (to be referred to as the Doppler frequency hereinafter) from the photodetector 9. Even if the velocity $V_0$ of the moving object 7 is low, a sufficient frequency difference can be assured with respect to the low-frequency component caused by the flow of the speckle pattern or the change in transmittance (or reflectance) of the moving object by setting $f_R$ to be an appropriate value, and only a Doppler signal is extracted by electrically removing the low-frequency components, thus allowing velocity detection.

Assume that the electro-optic element 10 has a thickness d=1 mm and a length a=20 mm, and the laser wavelength is set to be λ=780 nm. In this case, if a voltage amplitude V=230 V, the phase difference between the two light beams is 2π. When a serrodyne driving operation is performed with the frequency $f_R$, a frequency shift occurs by $f_R$.

In the first embodiment, since the light beams 5a and 5b are transmitted through the same electro-optic element 10, structural stability is ensured. In addition, since the heat conductors 12 are in contact with the entire upper and lower surfaces of the electro-optic element 10 via the silicone rubber sheets 13, a temperature difference and a temperature gradient are prevented, thereby ensuring stability against heat.

FIGS. 4A and 4B are views showing the main part of the second embodiment of the present invention. This embodiment is the same as the first embodiment except for a frequency shifter 102. The frequency shifter 102 of the second embodiment includes electrodes 11c and 11d in addition to the arrangement of the electro-optic element 10 of the first embodiment. Electrodes 11a and 11b are arranged at a light-transmitting portion for a light beam 5a, and the electrodes 11c and 11d are arranged at a light-transmitting portion for a light beam 5b so as to apply electric fields to the respective light-transmitting portions in opposite directions.

In this embodiment, both the light beams 5a and 5b from a laser light source 1 are polarized in the direction of the Z-axis and transmitted through the same electro-optic element 10, in which the two light beams 5a and 5b undergo frequency shifts.

Similar to the first embodiment, assume that the electro-optic element 10 has a thickness d=1 mm and a length a=20 mm, and the laser wavelength is set to be λ=780 nm. In this case, a voltage amplitude V=115 V, and the phase difference between the two light beams is 2π. That is, the serrodyne driving voltage can be decreased to ½ that in the first embodiment. When a serrodyne driving operation is performed with a frequency $f_R$, a frequency shift occurs by $f_R$.

Figures 5A, 5B:
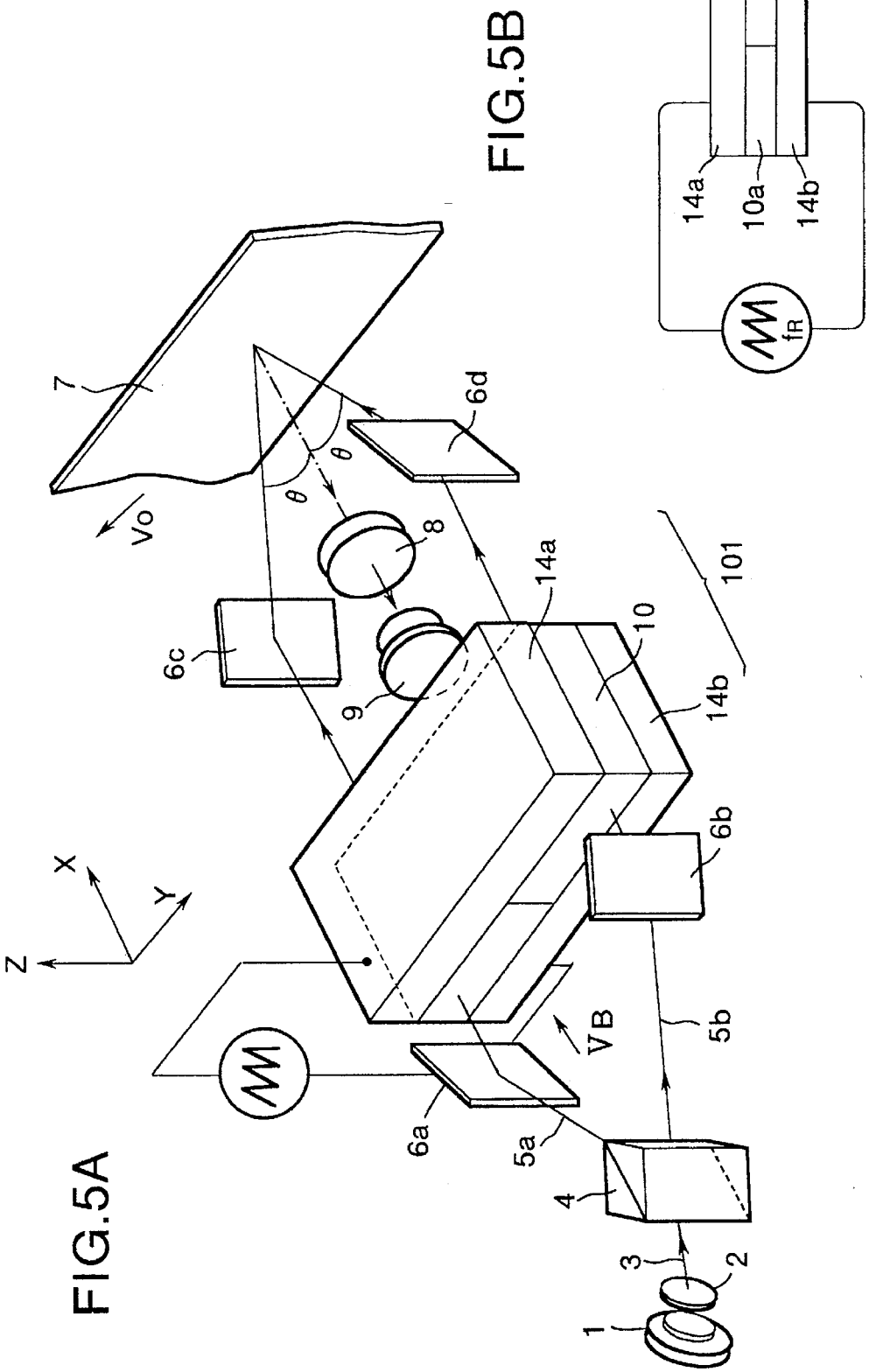
FIGS. 5A and 5B are views showing the main part of the third embodiment of the present invention, FIG. 5B being a view seen from an arrow VB in FIG. 5A.

FIGS. 5A and 5B are views showing the main part of the third embodiment of the present invention. This embodiment is the same as the first embodiment except for a frequency shifter 103.

The frequency shifter 103 of this embodiment has two electro-optic elements 10a and 10b. Both the electro-optic elements 10a and 10b consist of electro-optic crystals and have the same thickness and length. In addition, the crystallographic axes of two electro-optic elements 10a and 10b are arranged in opposite directions with respect to the Z-axis. Heat conducting electrodes 14a and 14b constitute good heat conductors such as copper members and cover two light-transmitting portion. The heat conducting electrodes 14a and 14b are widely in contact with the upper and lower surfaces of the electro-optic elements 10a and 10b.

In this embodiment, the heat conducting electrodes 14a and 14b constitute an element of a temperature uniformizing means.

Similar to the first embodiment, assume that the electro-optic element 10 has a thickness d=1 mm and a length a=20 mm, and the laser wavelength is set to be λ=780 nm. In this case, a voltage amplitude V=115 V, and the phase difference between the two light beams is 2π. That is, the serrodyne driving voltage can be decreased to ½ that in the first embodiment. When a serrodyne driving operation is performed with a frequency $f_R$, a frequency shift occurs by $f_R$.

In this embodiment, by only arranging the crystallographic axes of the two electro-optic elements 10a and 10b in opposite directions, the directions of electric fields at the respective light-transmitting portions for light beams 5a and 5b can be made to coincide with each other. This allows the use of a common electrode. In addition, since the heat conducting electrodes 14a and 14b are widely in contact with the upper and lower surfaces of the electro-optic elements 10a and 10b, the thermal bonding power increases, and the temperature uniformity of the electro-optic elements 10a and 10b improves.

FIGS. 6A and 6B are views showing the main part of an optical displacement measurement apparatus using a frequency shifter according to the fourth embodiment of the present invention.

This embodiment is the same as the first embodiment shown in FIGS. 2A and 2B except for a frequency shifter 104.

In the frequency shifter 104 of this embodiment, two electro-optic elements 14a and 14b consisting of electro-optic crystals and having the same thickness and length are arranged such that their crystallographic axes are set in opposite directions with respect to the Z-axis.

Referring to FIGS. 6A and 6B, A1 electrodes 15a and 15c are deposited on the upper and lower surfaces of the electro-optic element 14a, and A1 electrodes 15b and 15d are deposited on the upper and lower surfaces of the electro-optic element 14b. The A1 electrodes 15a and 15b are electrically connected to each other via a bonding wire 16a, and the A1 electrodes 15c and 15d are electrically connected to each other via a bonding wire 16b. Similar to the first embodiment, assume that the electro-optic element 10 has a thickness d=1 mm and a length a=20 mm, and the laser wavelength is set to be λ=780 nm. In this case, a voltage amplitude V=115 V, and the phase difference between the two light beams is 2π. That is, the serrodyne driving voltage can be decreased to ½ that in the first embodiment. When a serrodyne driving operation is performed with a frequency $f_R$, a frequency shift occurs by $f_R$.

In this embodiment, since the application voltage can be decreased with a simple arrangement, a compact apparatus can be realized.

In the above description, the frequency shifter of the present invention is applied to the laser Doppler velocimeter, but may be applied to an encoder. In a conventional encoder, a scale (diffraction grating) is disposed on an object to be measured, and two signals (phases A and B) having a phase difference of 90° are detected with a sine wave in accordance with the moving amount of the object. The moving direction is then detected by comparing the phases A and B. A method of achieving a high resolution by electrically dividing a sine wave as an output signal is widely used.

If, however, the object is at rest, a DC state without any beat is set. As a result, the division performance deteriorates because of a DC drift, 1/f noise, and the like.

If the frequency shifter is applied to the encoder, since a predetermined frequency is superposed as a bias even in a stationary state, DC components can be electrically cut by a bandpass filter or the like. With this operation, a DC drift or 1/f noise can be prevented to easily increase the resolution.

As has been described above, since the temperature uniformizing means are in tight contact with the electro-optic crystal, the temperature difference between the portions, of the electro-optic crystal, through which two light beams are transmitted, and the temperature gradients in the light-transmitting areas can be greatly reduced to realize a stable frequency shift.

In addition, since two light beams are transmitted through the same electro-optic crystal, structural stability is ensured. The driving voltage can be reduced to ½ by applying electric fields to the two light-transmitting portions in opposite directions.

Furthermore, since the crystallographic axes of the two electro-optic crystals through which two light beams are transmitted are arranged in opposite directions, the electrodes can be constituted by good heat conductors, ensuring a higher thermal bonding strength.

By using the frequency shifters having the above arrangements, high-precision, stable, optical displacement measurement apparatuses can be realized.

Moreover, since the crystallographic axes of the two electro-optic crystals through which two light beams are transmitted are arranged in opposite directions, the application voltage can be reduced with a simple arrangement to realize a compact apparatus. By applying this frequency shifter to an optical displacement measurement apparatus, high-precision and stable measurement can be performed by a compact apparatus.

What is claimed is:

1. A frequency shifter for modulating a frequency of an incident light beam, said shifter comprising:

an electro-optic crystal portion to be arranged at an incident position;

an electrode arranged on said electro-optic crystal portion;

voltage application means for applying a voltage to said electro-optic crystal portion via said electrode; and means, arranged at least at a portion of said electro-optic crystal portion, for uniformizing a temperature of said electro-optic crystal portion, wherein said means for uniformizing the temperature is arranged over portions, of said electro-optic crystal portion, on which two light beams are respectively incident.

2. A shifter according to claim 1, wherein said electrode is arranged at only an area through which one of the two light beams, which are incident on said electro-optic crystal portion, is transmitted.

3. A shifter according to claim 1, wherein said electro-optic crystal portion includes two electro-optic crystals in areas through which the two incident light beams are transmitted, said electro-optic crystals having crystallographic axes arranged in opposite directions.

4. A shifter according to claim 3, wherein said electrode is commonly arranged for said two electro-optic crystals.

5. A shifter according to claim 4, wherein said means for uniformizing the temperature is constituted by a good heat conductor and also serves as said electrode.

6. An apparatus for optically detecting displacement information of an object, said apparatus comprising:

light source means for emitting at least one light beam;

a frequency shifter for modulating a frequency of at least one light beam emitted from said light source means, said frequency shifter including:
 i) an electro-optic crystal portion to be arranged at an incident position,
 ii) an electrode arranged on said electro-optic crystal portion,
 iii) voltage application means for applying a voltage to said electro-optic crystal portion via said electrode, and
 iv) means, arranged at least at a portion of said electro-optic crystal portion, for uniformizing a temperature of said electro-optic crystal portion; and a photodetecting portion for detecting light from the object irradiated with at least one light beam frequency-modulated by said frequency shifter, wherein said light source means emits two light beams, said frequency shifter causes the two light beams to be incident on said electro-optic crystal portion and modulates at least one of the two light beams, and said photodetecting portion detects light from the object irradiated with the two light beams.

7. An apparatus according to claim 6, wherein said means for uniformizing the temperature is arranged over portions, of said electro-optic crystal portion, on which the two light beams are respectively incident.

8. A frequency shifter for modulating a frequency of an incident light beam, said shifter comprising:

an electro-optic crystal portion to be arranged at an incident position, said electro-optic crystal portion having two electro-optic crystals in areas through which two incident light beams are respectively transmitted, and said two electro-optic crystals having crystallographic axes arranged in opposite directions with respect to an axis perpendicular to a direction of arrangement of said two electro-optic crystals;

an electrode arranged on said electro-optic crystal portion to apply voltages to said two electro-optic crystals in the same direction; and voltage application means for applying a voltage to said electro-optic crystal portion via said electrode.

9. A shifter according to claim 8, wherein said electrode is commonly arranged for said two electro-optic crystals.

10. A frequency shifter for modulating a frequency of an incident light beam, said shifter comprising:

an electro-optic crystal portion to be arranged at an incident position, said electro-optic crystal portion having two electro-optic crystals in areas through which two incident light beams are respectively transmitted, and said two electro-optic crystals having crystallographic axes arranged in opposite directions;

an electrode arranged on said electro-optic crystal portion to apply voltages to said two electro-optic crystals in the same direction;

voltage application means for applying a voltage to said electro-optic crystal portion via said electrode; and means, arranged at least at a portion of said electro-optic crystal portion, for uniformizing a temperature of said electro-optic crystal portion.

11. A shifter according to claim 10, wherein said means for uniformizing the temperature is constituted by a good heat conductor and also serves as said electrode.

12. An apparatus for optically detecting displacement information of an object, said apparatus comprising:

light source means for emitting at least one light beam;

a frequency shifter for modulating a frequency of at least one light beam emitted from said light source means, said frequency shifter including:

i) an electro-optic crystal portion to be arranged at an incident position, said electro-optic crystal portion having two electro-optic crystals in areas through which two incident light beams are respectively transmitted, and said two electro-optic crystals having crystallographic axes arranged in opposite directions with respect to an axis perpendicular to a direction of arrangement of said two electro-optic crystals, ii) an electrode arranged on said electro-optic crystal portion to apply voltages to said two electro-optic crystals in the same direction, and iii) voltage application means for applying a voltage to said electro-optic crystal portion via said electrode; and a photodetecting portion for detecting light from the object irradiated with at least one light beam frequency-modulated by said frequency shifter, thereby detecting displacement information of the object.

13. An apparatus according to claim 12, wherein said electrode is commonly provided for said two electro-optic crystals.

* * * * *

UNITED STATES PATENT AND TRADEMARK OFFICE
CERTIFICATE OF CORRECTION

PATENT NO.   : 5,629,793
DATED        : May 13, 1997
INVENTOR(S)  : Takamiya et al.

It is certified that error appears in the above-identified patent and that said Letters Patent is hereby corrected as shown below:

COLUMN 4:

Line 34, "$n^{e3}\gamma_{33}E_3 << 1$" should read --$n_e^3\gamma_{33}E_3 << 1$--.

COLUMN 7:

Line 40, "portions," should read --portions--.

COLUMN 8:

Line 10, "portions," should read --portions--.

Signed and Sealed this

Third Day of February, 1998

Attest:

BRUCE LEHMAN

*Attesting Officer*    *Commissioner of Patents and Trademarks*